US007835572B2

United States Patent
Ferman (10) Patent No.: US 7,835,572 B2
(45) Date of Patent: Nov. 16, 2010

(54) RED EYE REDUCTION TECHNIQUE

(75) Inventor: A. Mufit Ferman, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 600 days.

(21) Appl. No.: 10/676,277

(22) Filed: Sep. 30, 2003

(65) Prior Publication Data

US 2005/0286766 A1    Dec. 29, 2005

(51) Int. Cl.
*G06K 9/00* (2006.01)
(52) U.S. Cl. .................................. 382/167; 382/163
(58) Field of Classification Search .................. None
See application file for complete search history.

(56) References Cited

U.S. PATENT DOCUMENTS

| | | | |
|---|---|---|---|
| 5,130,789 A | 7/1992 | Dobbs et al. | |
| 5,432,863 A | 7/1995 | Benati et al. | |
| 5,748,764 A | 5/1998 | Benati et al. | |
| 5,848,185 A * | 12/1998 | Koga et al. | 382/173 |
| 5,990,973 A | 11/1999 | Sakamoto | |
| 6,009,209 A | 12/1999 | Acker et al. | |
| 6,016,354 A | 1/2000 | Lin et al. | |
| 6,134,339 A | 10/2000 | Luo | |
| 6,151,403 A | 11/2000 | Luo | |
| 6,160,912 A * | 12/2000 | Usami | 382/167 |
| 6,204,858 B1 * | 3/2001 | Gupta | 382/167 |
| 6,252,976 B1 | 6/2001 | Schildkraut et al. | |
| 6,278,491 B1 | 8/2001 | Wang et al. | |
| 6,285,410 B1 | 9/2001 | Marni | |
| 6,292,574 B1 | 9/2001 | Schildraut et al. | |
| 6,678,413 B1 * | 1/2004 | Liang et al. | 382/181 |
| 6,728,401 B1 * | 4/2004 | Hardeberg | 382/167 |
| 6,731,792 B1 * | 5/2004 | Tanaka | 382/164 |
| 6,760,465 B2 * | 7/2004 | McVeigh et al. | 382/103 |
| 6,798,903 B2 * | 9/2004 | Takaoka | 382/167 |

(Continued)

FOREIGN PATENT DOCUMENTS

EP    1 199 672 A2    10/2001

(Continued)

OTHER PUBLICATIONS

Hardeberg, Jon. Y., *Red Eye Removal Using Digital Color Image Processing*, In Proc. PICS 2001: Image Processing, Image Quality, Image Capture Systems Conference, pp. 283-287, Montreal, Canada, May 2001.

(Continued)

*Primary Examiner*—Yuzhen Ge
(74) *Attorney, Agent, or Firm*—Chernoff, Vilhauer, McClung & Stenzel (57) ABSTRACT

A red-eye reduction technique includes converting a multi-channel image to a hue, saturation, value color space. The hue channel, the saturation channel, and the value channel are processed to identify the location of the red-eye within the image, if any.

13 Claims, 6 Drawing Sheets

U.S. PATENT DOCUMENTS

| | | | |
|---|---|---|---|
| 6,895,112 B2 * | 5/2005 | Chen et al. | 382/167 |
| 7,010,160 B1 * | 3/2006 | Yoshida | 382/162 |
| 7,013,025 B2 * | 3/2006 | Hiramatsu | 382/103 |
| 7,035,461 B2 * | 4/2006 | Luo et al. | 382/167 |
| 7,254,268 B2 * | 8/2007 | Zhao et al. | 382/190 |
| 7,362,354 B2 * | 4/2008 | Lin | 348/222.1 |
| 2002/0136450 A1 | 9/2002 | Chen et al. | |
| 2002/0150306 A1 | 10/2002 | Baron | |
| 2002/0172419 A1 | 11/2002 | Lin et al. | |
| 2002/0176623 A1 | 11/2002 | Steinberg | |
| 2003/0151674 A1 * | 8/2003 | Lin | 348/222.1 |
| 2004/0184670 A1 * | 9/2004 | Jarman et al. | 382/274 |
| 2004/0240747 A1 * | 12/2004 | Jarman et al. | 382/274 |

FOREIGN PATENT DOCUMENTS

| | | |
|---|---|---|
| JP | A-H10-233929 | 9/1998 |
| JP | A-H10-240977 | 9/1998 |
| JP | A-2001-188906 | 7/2001 |
| JP | A-2003-036438 | 2/2003 |

OTHER PUBLICATIONS

Czubin, K., Smolka, B., et. al., *On the Red Eye Effect Removal Algorithm*, in Proc. First European Conference on Color in Graphics, Imaging and Vision (CGIV), pp. 292-297, Poitiers, France, Apr. 2002.

Hardeberg, Jon Y., *Digits! Red Eye Removal*, Journal of Imaging Science and Technology, vol. 46, No. 4, pp. 375-381, Jul./Aug. 2002.

Schildkraut, Jay S. and Gray, Robert T., *A Fully Automatic Redeye Detection and Correction Algorithm*, in Proc. ICIP 2002, vol. I, pp. 801-803, Rochester, NY, Sep. 2002.

Gaubatz, M. and Ulichney, R., *Automatic Red-Eye Detection and Correction*, Proc. ICIP 2002, vol. I, pp. 804-807, Rochester, NY, Sep. 2002.

Held, Andreas, *Model-Based Correction of Red Eye Defects*, Proc. Tenth Color Imaging Conference: Color Science and Engineering Systems, Technologies, Applications, pp. 223-228, Scottsdale, AZ, Nov. 2002.

* cited by examiner

RED EYE REDUCTION TECHNIQUE

BACKGROUND OF THE INVENTION

The invention relates generally to the field of digital image processing, and in particular, to the identification of and the reduction of the red-eye effect in images.

The increased use of computers in many applications has drawn increasing focus on improving the man-machine interface. It is the desire of many applications to locate the face of the user in an image, then to process it to robustly identify the person. The algorithms for facial recognition have dramatically improved in recent years and are now sufficiently robust for many applications. The weak part of the system is the face detection and location. Other applications for facial imaging beyond identification are also growing in interest, in particular perceptual computing, such as discerning a reaction or emotion from a user's face. This would enable computer-driven systems to be more responsive, like a human. Again, these algorithms will be limited by the weaknesses in face detection and location.

Figure 1:
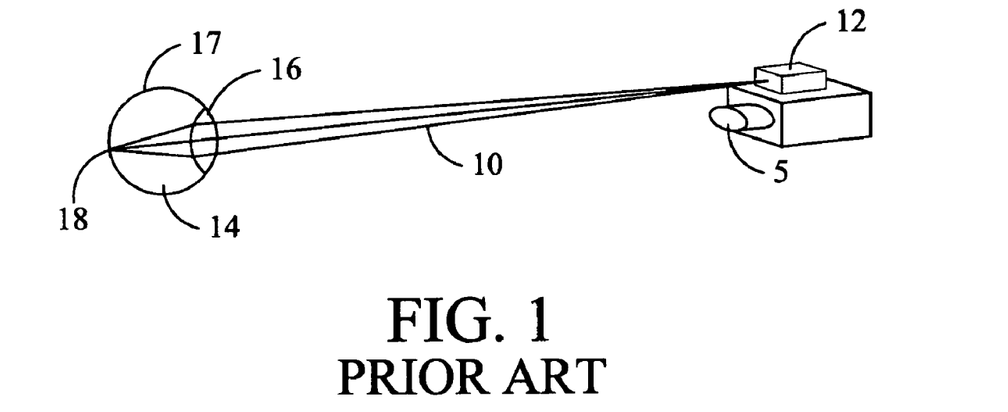
FIG. 1 illustrates a camera, flash, and eye.

When flash illumination is used during the capture of an image that contains sizable human faces, the pupils of people sometimes appear red because the light is partially absorbed by capillaries in the retina. As illustrated in FIG. 1, the light rays 10 from the flash illumination source 12 enter the eye 14 through the eye lens 16, and form an image 18 of the illumination source 12 on retina 17. The eye-defect in captured images, known as the "red-eye effect" is mostly seen with human eyes. In case animals are captured, the eye-defect will show a bright green or yellow color. Animal eyes are generally more difficult to detect for pattern recognition algorithms due to the large variations in animal facial structure, complexion, hair and structure of the eyes itself.

Figure 2:
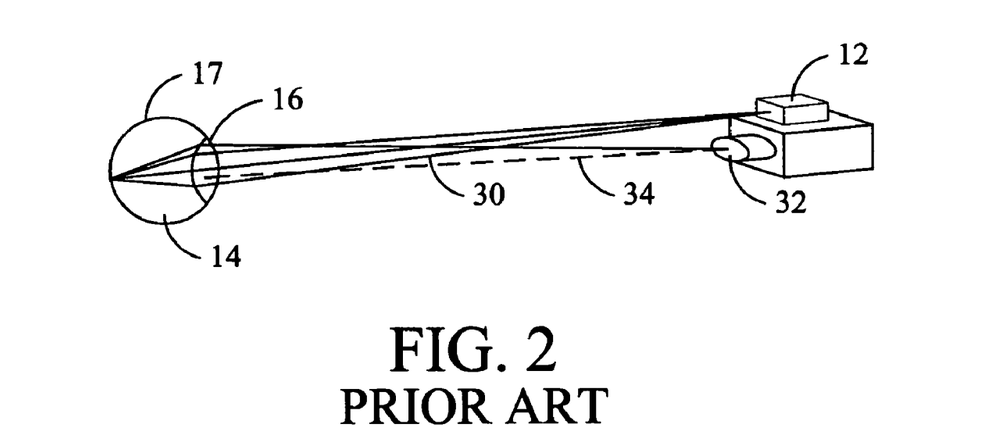
FIG. 2 illustrates the camera, flash, and eye of FIG. 1 with the axis resulting in a red-eye effect.

Referring to FIG. 2, the light rays 30 reflected from the retina 17 exit the eye 14 through the eye lens 16, and finally enter the camera lens 32. If the camera lens 32 is placed close to the illumination source 12, the red-eye effect will be maximized. In other words, the amount of red-eye or eye-defect being observed increases as the illumination source 12 gets closer to an optical axis 34 defined by the camera lens 32.

The general technique for red-eye reduction within cameras has been to impact two parameters: (a) reduce the pupil diameter of the subject, for example by emitting a series of small pre-flashes prior to capturing the desired image with full illumination; and, (b) increase the flash to lens separation, so that the illumination impinging on the subjects eyes is reflected at an angle that misses the taking lens.

In most cases, where a flash is needed to illuminate the subject, the subject's pupils are dilated due to the low ambient illumination. Light from the flash can then enter the eye through the pupil and is reflected off the blood vessels at the back of the retina. This reflection may be recorded by the camera if the geometry of the camera lens, the flash, and the subject's eyes is just right, rendering the captured image unpleasant and objectionable to viewers. Hence there is a significant need for automatic methods that identify and correct red-eye areas in a captured image.

A number of methods have been proposed for detecting and/or removing red-eye artifacts that result in the images themselves. The majority of these methods are either (i) supervised; i.e. they require the user to manually identify the subregions in an image where the artifacts are observed, or (ii) dependent on skin/face and/or eye detection to find the areas of interest. However, manual user identification is cumbersome for the user, especially when a lot of images are involved. In addition, typical skin, face, and eye detection techniques are computationally intensive.

DETAILED DESCRIPTION OF THE PREFERRED EMBODIMENT

Figure 3:
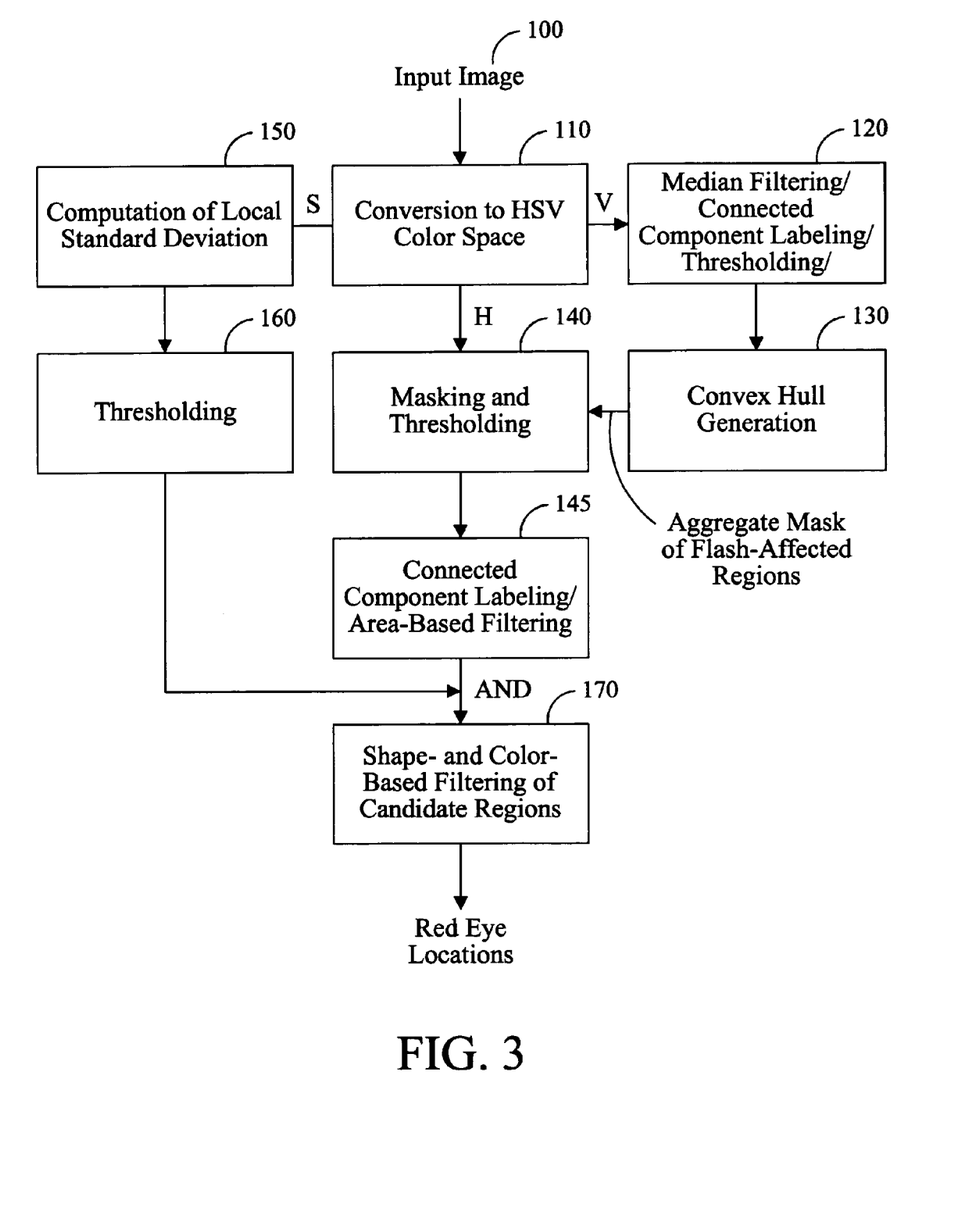
FIG. 3 illustrates an exemplary flow chart for identifying red-eye in an image.

To identify the existence of the red-eye in an image in a manner that is free from user identification of an image as containing the red-eye or otherwise the sub-region of the image containing the red-eye, the present inventor came to the realization that modification of a typical red, green, blue ("RGB") image, to one that includes an enhanced luminance channel (e.g., >60% of the luminance information in a single channel), facilitates such an identification and reduction. Referring to FIG. 3, typically the input to a red-eye identification and reduction system includes a color digital image 100, which may be in a variety of different color spaces. The color image 100 is transformed, or otherwise provided, to a hue, saturation, value (e.g., hue saturation intensity) color space at block 110. The luminance information is contained in the value (e.g., intensity) channel of the color space which typically contains greater than 60% of the luminance information. Saturation may be defined as an expression of the relative bandwidth of the visible output from a light source. As saturation increases, colors appear more "pure." As saturation decreases, colors appear more "washed-out." Hue may be defined as the wavelength within the visible-light spectrum at which the energy output from a source is greatest (or substantially the greatest). Other color spaces may likewise be used, as desired, to identify red-eye.

With the color channels of the image modified to a hue, saturation, value ("HSV") color space, each channel of the HSV color space may be processed and analyzed in a different manner, and combined in some manner, to accurately identify the red-eye artifacts.

As previously noted, the red-eye artifacts in an image occur as a direct consequence of using a flash while acquiring the image. Accordingly, the red-eye detection technique should focus on those regions of the image that have been affected (i.e. illuminated) by the flash. At block 120, to identify such potential red-eye regions a thresholding operation is applied to the brightness (V) component $I_v$ of the original image. The pixels that exceed the threshold value $T_f$ comprise a flash mask, $M_f$:

$$M_f(i, j) = \begin{cases} 1, & I_v(i, j) \geq T_f \\ 0, & \text{otherwise} \end{cases}$$

The value of threshold $T_f$ may be any suitable value, such as for example, a scalar value, an integer, or a dynamic value based upon the particular image. For example, $T_f$ is computed for each input image individually using a technique described in a paper by Otsu, N. (1979), "A thresholding selection method from gray-level histogram", in IEEE Trans. Syst.

Man Cybernet. 9(1), 62-66.). Furthermore, the value of $T_f$ may be selected such that the resulting mask function may be used to determine whether the input image is a flash image or not (e.g., has sufficient red-eye effect).

Once the flash mask $M_f(i,j)$ is determined, other post-processing operations may be applied to reduce the number of isolated pixels at block 120. These operations may include, for example, median filtering, and morphological operations such as erosion and opening. At block 130, the remaining pixels in $M_f$ are then grouped into a plurality of "contiguous" regions using a connected component technique, such as a convex hull technique or otherwise, and the areas of the connection components are computed. A convex hull is a polygonal area that is of smallest length and so that any pair of points within the area have the line segment between them contained entirely inside the area. Regions with areas smaller than a threshold are discarded or otherwise not used. The convex hull of each remaining region is subsequently computed and a binary mask that comprises the union of the convex hulls is constructed to yield the final flash mask $M_f$.

Figure 4A:
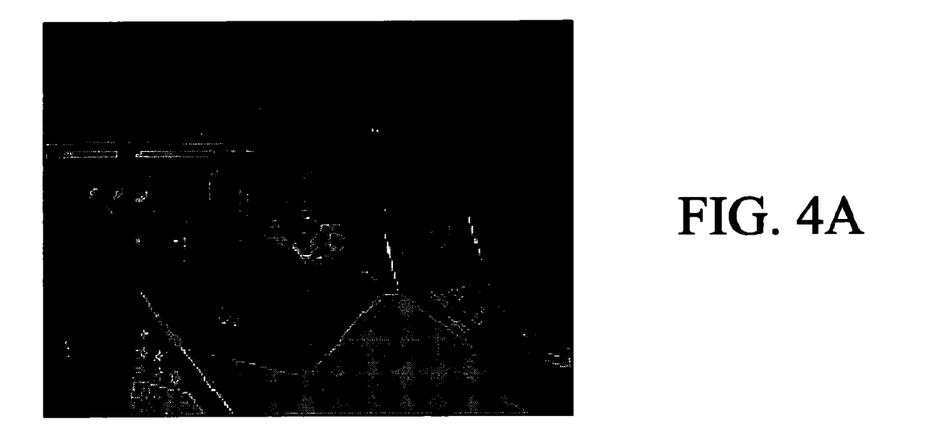
FIGS. 4A-4E highlight the various stages in the construction of $M_f$.
Figure 4B:
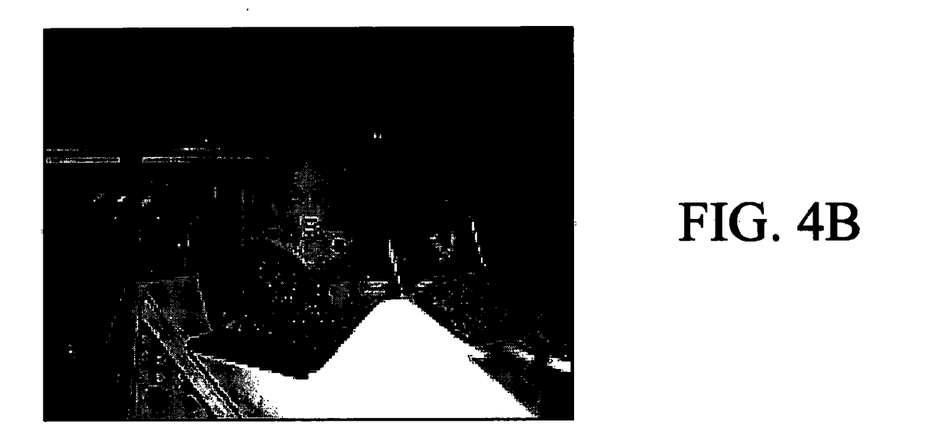
Figure 4C:
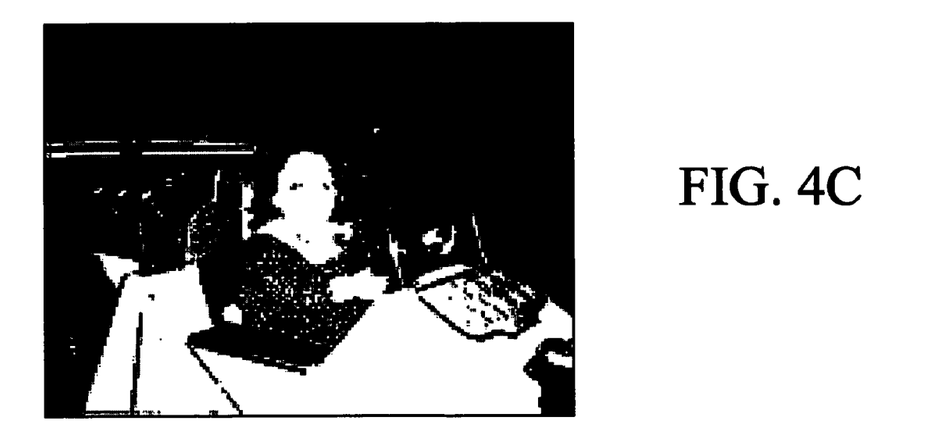
Figure 4D:
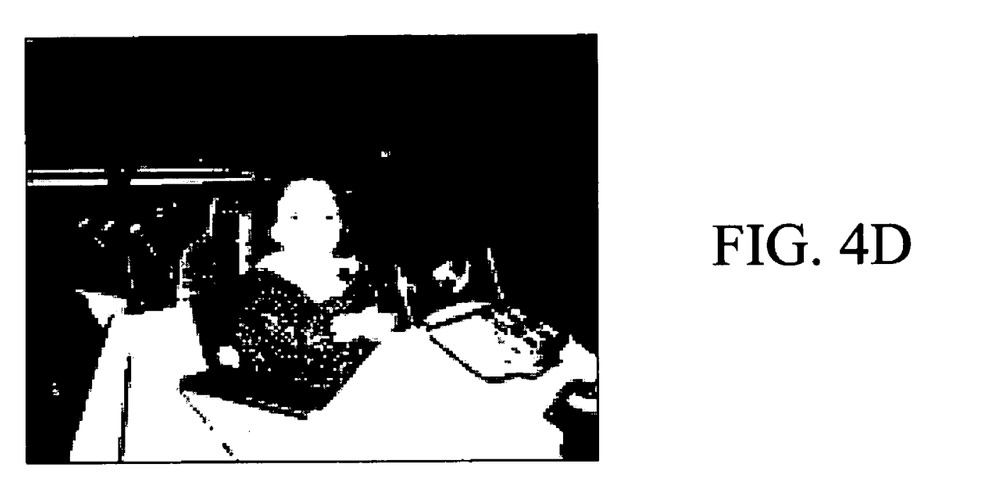
Figure 4E:
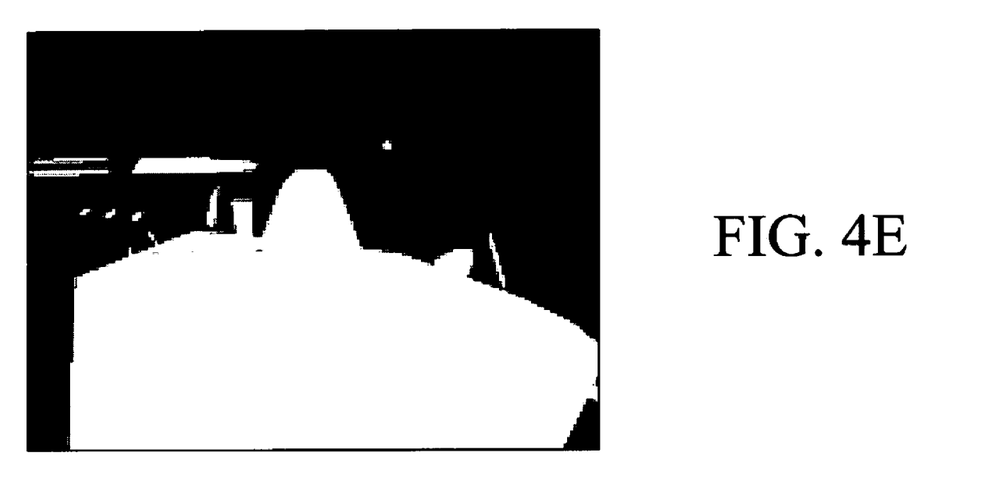

FIGS. 4A-4E highlight the various stages in the construction of $M_f$. FIG. 4A depicts the input image I; the V component of the image, $I_v$, is shown in FIG. 4B. The results of the thresholding and post-processing operations are shown in FIGS. 4C and 4D, respectively. The final flash mask $M_f$, obtained after area-based thresholding and convex hull generation, is depicted in FIG. 4E. $M_f$ represents the areas in the input image that may contain red-eye artifacts; therefore, the rest of the processing may be restricted to the regions identified by $M_f$.

Figure 5A:
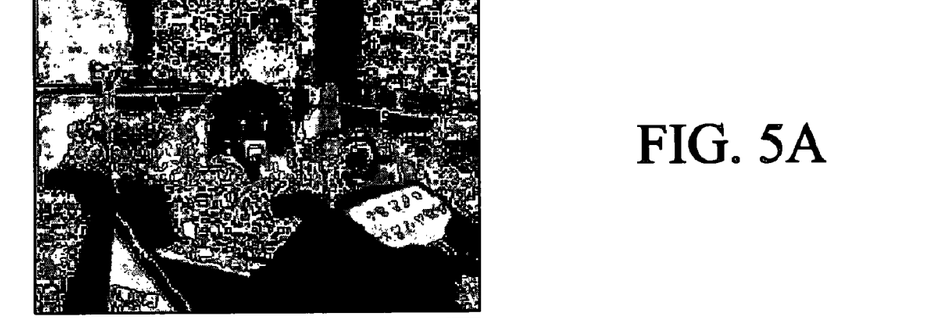
FIGS. 5A-5D illustrate the various stages in the construction of $M_h$.

After $M_f$ is computed, it may be used for further processing on another component of the image, such as the hue component $I_h$. $M_f$ may be applied to $I_h$ to obtain a masked hue version at block 140. Hue may be defined as the dominant color of a pixel, and it is represented as an angle on the unit circle between 0 degrees and 360 degrees. The present inventor came to the realization that when the hue values are mapped to an appropriate interval for display (e.g., to [0,1] or [0,255]), red-eye locations are observed to appear as light, contiguous regions on darker backgrounds, as shown in FIG. 5A. This property may be exploited in a suitable manner, such as by thresholding to eliminate the dark areas and thus reduce the area that is analyzed for red-eye artifacts:

$$M_h(i, j) = \begin{cases} 1, & I_h^m(i, j) \geq T_h \\ 0, & \text{otherwise} \end{cases}$$

The value of the threshold Th can be chosen in any suitable manner, such as setting $T_h \in [0,1]$, and set to 0.125.

After $M_h$ is calculated, several post-processing operations at block 145 may be applied to refine it. These operations may include, for example, median filtering, and morphological filtering such as dilation and closing. The selected pixels in $M_h$ are then grouped into contiguous regions using a connected component technique, and several features are computed for each region. Specifically, one may consider the area, aspect ratio, and/or extent of each region to determine the likelihood that the region is a red-eye area. Extent may be defined as the ratio of the total area of the region (i.e. the number of pixels in the region) to the number of pixels in the smallest bounding box for the region. Regions whose areas and/or aspect ratios fall outside predetermined ranges, or whose extent values are below a specified threshold, are discarded. In the preferred embodiment, the minimum and maximum allowed sizes for a region are computed dynamically based on the size of the input image. The aspect ratio test permits one to eliminate regions that are elongated; the aspect ratio of a candidate red-eye region is expected to be in the interval (0.33,2). Also, if the extent of a region is less than 0.33, the region is removed from the list of candidate red-eye locations.

Figure 5B:
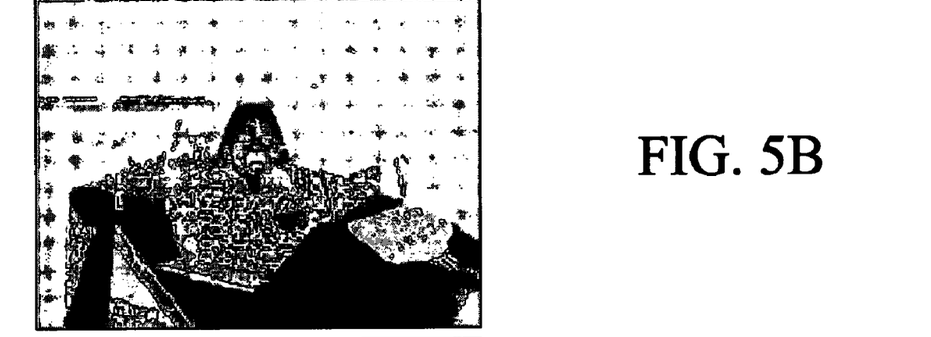
Figure 5C:
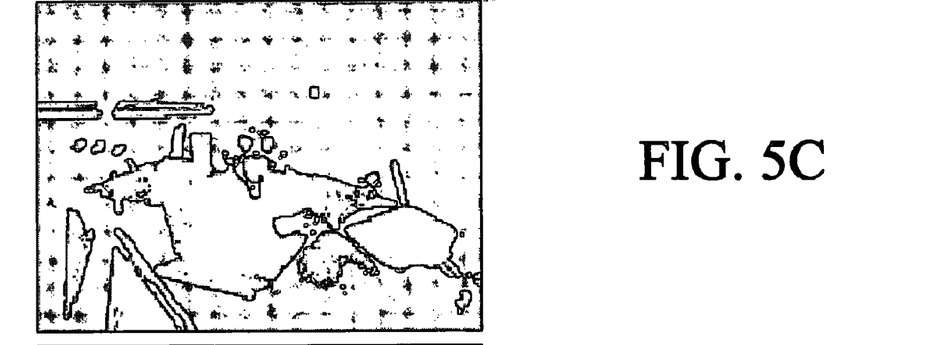
Figure 5D:
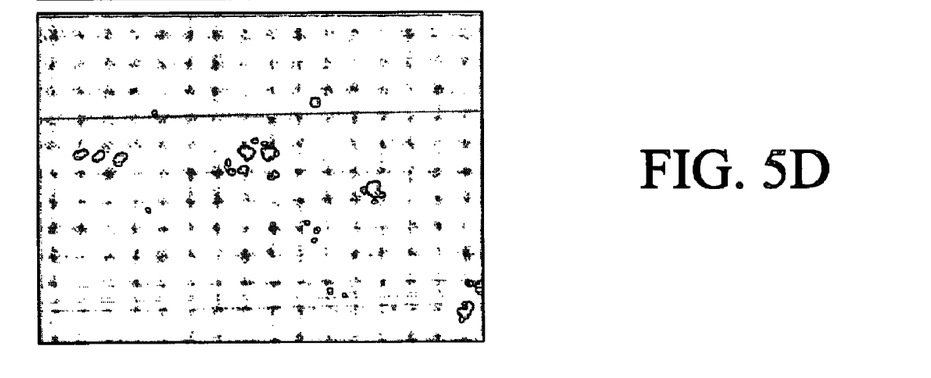

FIGS. 5A-5D illustrate the various stages in the construction of $M_h$. FIG. 5A depicts the hue component $I_h$ of the image; the masked hue component, is depicted in FIG. 5B. The result of the thresholding and post-processing operations is shown in FIG. 5C. The final hue mask $M_h$, obtained after connected component labeling and area- and shape-based filtering is depicted in FIG. 5D.

Figure 6A:
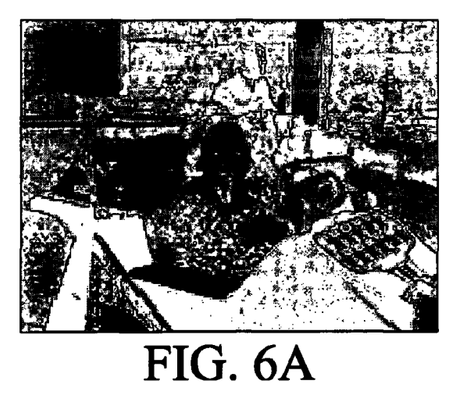
FIGS. 6A-6F illustrates various stages in the identification of the red-eye.
Figure 6B:
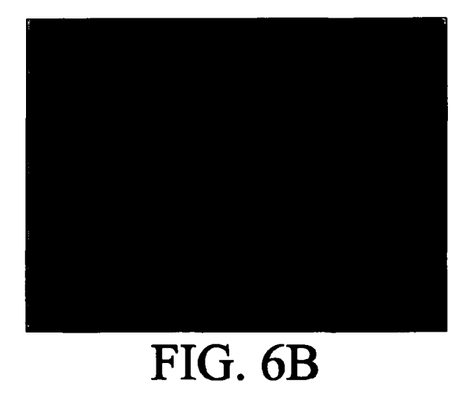
Figure 6C:
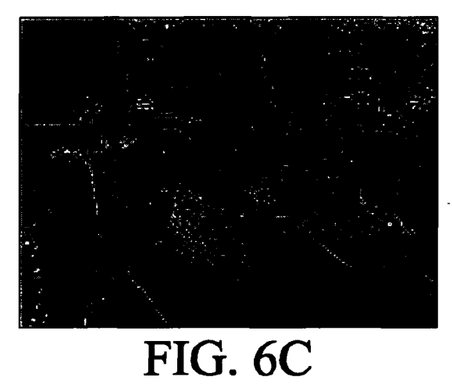

The present inventor also came to the realization that the information in the saturation component of the image may be used to further refine the potential candidate red-eye regions. It was observed that pixels in the red-eye regions often have high saturation values, as seen in the example image in FIG. 4A. This phenomenon is also shown in FIG. 6A, which shows the saturation component $I_s$ for the example image. Furthermore, the local variation in the saturation component is highly pronounced around the red-eye regions. To exploit this property one may compute the standard deviation of the saturation component for each pixel using a local neighborhood (FIG. 6(B)) at block 150 (FIG. 3). Pixels that are likely to be red-eye artifacts are then identified by a thresholding operation at block 160, which yields the saturation mask $M_{sd}$, as shown in FIG. 6C. The value of the threshold may be chosen in different ways. In the preferred embodiment, the threshold is set to 0.15.

Figure 6D:
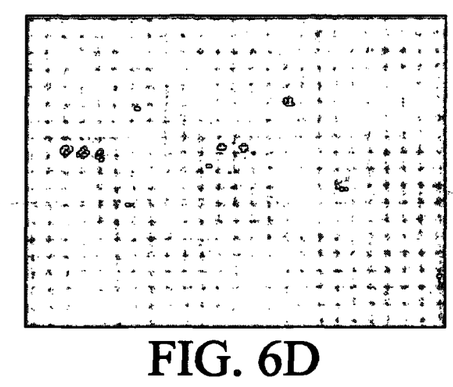
Figure 6E:
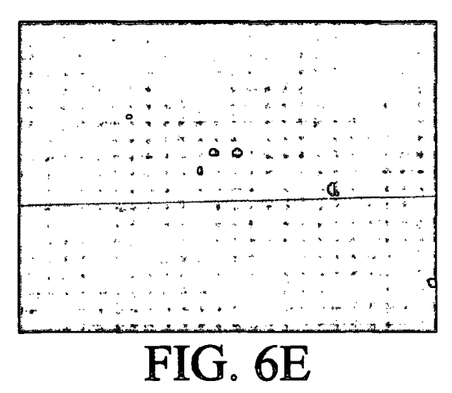

The intersection of $M_h$ and $M_d$ is then computed to yield a final mask $M_{hd}$ (FIG. 6(D)) that represents the locations where the red-eye artifacts are most likely to occur at block 170. As in earlier portions of the technique, several post-processing operations may be applied to refine $M_{hd}$. These operations may include, for example, median filtering, and morphological filtering such as dilation and closing. The selected pixels in $M_{hd}$ are then grouped into contiguous regions using a connected component technique, and several shape-based features are computed for each labeled region. Specifically, the technique may compute the eccentricity and circularity of each region. Eccentricity is defined as the ratio of the distance between the foci of the ellipse that has the same second-moments as the region and its major axis length. The value of eccentricity varies between 0 and 1; the higher the eccentricity value, the closer to a line segment the region is. Circularity, as the name implies, is a measure of how closely a region resembles a circle, and is defined as the ratio of the square of the region perimeter to the area of the region. These properties are used to determine the likelihood that a particular region contains red-eye artifacts (FIG. 6(E)).

Figure 6F:
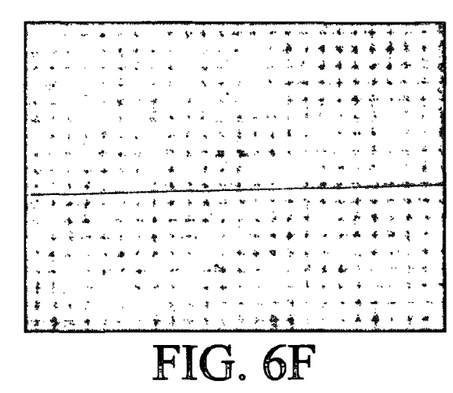

The final stage of the technique involves color-based analysis of the remaining regions to determine which pixels are strongly red. This may be achieved using the hue component, by specifying the appropriate range of hue angles corresponding to color red. Alternatively this color test may be carried out in other color spaces, such as RGB, YCrCb, La*b*, and so on. In the preferred embodiment, the system utilizes the RGB values of the pixels in each candidate region to determine whether the region contains a red-eye artifact. The RGB values can be computed directly from the available HSV components be using a simple transformation. For each region, the system may compute the mean of each primary. The system may then determine whether (i) the mean red value is less than a specified threshold, or (ii) the ratio of the means of the green and blue components is below another predetermined threshold. Any region that satisfies either of the above criteria is discarded, and the remaining regions are identified as red-eye artifact locations (FIG. 6(F)).

The individual pixels that require correction within these regions are identified through an analysis of the color properties of the individual pixels. This analysis may include, for example, thresholding based on pixel color values, and clustering/region growing based on color similarity. The final output of the technique is a mask that identifies the individual pixels in the image that require red-eye correction. It is to be understood that the techniques described herein may be performed separately or as a result of mathematical equations without the need to convert an entire image.

It is noted that the preferred embodiment is capable of performing the entire operation in an unsupervised manner. In addition, the techniques does not require the detection of the face and/or skin regions in an image, and is therefore computationally efficient. Further, limiting the processing of the red-eye to those regions of the image that are affected by the flash illumination improves the computational efficiency.

The embodiments described herein can be implemented in any manner, such as for example, as a stand-alone computer application that operates on digital images or as a plug-in to other image/document management software; or it may be incorporated into an multi-function machine.

The invention claimed is:

1. A method to automatically identify sub-regions of a multi-channel image as containing red-eye, said method comprising:
   (a) converting said multi-channel image to a modified multi-channel image wherein at least one of said channels is an enhanced luminance channel that has more than 60% of the luminance information of said multi-channel image and at least one of said channels is a saturation channel, and applying a threshold to said enhanced luminance channel, said threshold constructed to produce a flash mask;
   (b) identifying a sub-region of said flash mask as containing a red-eye region based upon, at least in part, processing said saturation channel by applying a saturation mask to one or more pixels of said image, said saturation mask comparing the standard deviation of the saturation value of a respective pixel to a threshold of 0.15; and
   (c) removing the identified said red eye from said multi-channel image wherein the above method steps are performed by a computer.

2. The method of claim 1 wherein said standard deviation of said saturation value of a respective pixel is measured relative to the mean saturation of pixels in a neighborhood local to said respective pixel.

3. The method of claim 1 wherein said modified multi-channel image has hue, saturation, and intensity channels.

4. The method of claim 3 wherein said saturation channel represents the relative bandwidth of the visible output from a light source.

5. The method of claim 4 wherein said hue is substantially the wavelength within the visible-light spectrum at which the energy output from a source is the greatest.

6. A method to automatically identify sub-regions of a multi-channel image containing red-eye, said multi-channel image having at least a first channel and a second channel, said method comprising:
   (a) identifying a sub-region of said image as containing a red-eye region based upon, at least in part, applying a first mask to said first channel, said first mask comparing a first statistical measure of at least one pixel of said image to a first threshold to produce a flash mask characterized by the inclusion of those regions of said multi-channel image potentially affected by a flash, and the exclusion of those regions of said image not potentially affected by a flash, irrespective of whether an included or excluded region is within the boundaries of a person's face;
   (b) applying a second mask to said second channel of said multi-channel image, said second mask comparing a second statistical measure of at least one pixel of said image to a second threshold, said second statistical measure being a different statistical property than said first statistical measure; and
   (c) removing the identified said red eye from said multi-channel image, where said first statistical measure is the value of said pixel in said first channel and said second statistical measure is the standard deviation of said pixel in said second channel, wherein the value for said second threshold is 0.15 wherein the above method steps are performed by a computer.

7. The method of claim 6 wherein said first threshold is different than said second threshold.

8. The method of claim 6 wherein said standard deviation is measured relative to a mean measured over a neighborhood of pixels local to said pixel.

9. The method of claim 6 where said second channel represents saturation.

10. The method of claim 6 further comprising using a convex hull technique to identify contiguous regions.

11. The method of claim 10 wherein contiguous regions having a size less than a threshold are removed as potential red-eye regions, said threshold computed dynamically based on the size of the input image.

12. A method to automatically identify sub-regions of a multi-channel image containing red-eye, said method comprising:
   (a) providing said multi-channel image to said multi-channel image comprising luminance, hue, and saturation channels, respectively;
   (b) identifying a sub-region of said image as containing a red-eye region based upon, at least in part;
       (i) filtering out selective pixels of said image based upon a first mask applied to said luminance channel, said mask comparing the luminance value of respective pixels in said image to a first threshold;
       (ii) thereafter applying a convex hull technique to group remaining pixels of said image into a plurality of contiguous regions;
       (iii) thereafter applying a second mask to said hue channel, said second mask comparing the hue value of respective pixels in said plurality of contiguous regions to a second threshold;
       (iv) subdividing said plurality of contiguous regions into a plurality of contiguous sub-regions based upon said second mask and a connected component technique; and
       (v) filtering out the pixels in selective sub-regions based upon a comparison of the aspect ratio of respective said sub-regions to a third threshold;
   (c) applying a third mask to said saturation channel said third mask comparing the standard deviation of the saturation value of respective pixels in said plurality of contiguous sub-regions to a fourth threshold; and
   (d) removing the identified said red eye from said multi-channel image wherein the above method steps are performed by a computer.

13. The method of claim 12 wherein said fourth threshold is 0.15.

* * * * *